United States Patent [19]

Moskowitz

[11] 4,268,256
[45] May 19, 1981

[54] INSTRUCTIONAL WRITING PAPER FOR PERCEPTUALLY IMPAIRED CHILDREN

[76] Inventor: Ilene J. Moskowitz, 2611 NW. 56th Ave., Apt. 407, Lauderhill, Fla. 33313

[21] Appl. No.: 103,960

[22] Filed: Dec. 14, 1979

[51] Int. Cl.³ ............................................. G09B 11/04
[52] U.S. Cl. ....................................... 434/162; 283/45
[58] Field of Search ........................ 35/36, 37; 283/45

[56] References Cited

U.S. PATENT DOCUMENTS 3,638,332  2/1972  Jones ........................................ 35/37
4,173,082  11/1979  Niguette .................................. 35/37

*Primary Examiner*—Anton O. Oechsle
*Attorney, Agent, or Firm*—Ernest H. Schmidt

[57] ABSTRACT

An instructional writing paper system for perceptually impaired children wherein sets of two-striped bands of contrasting colors separated by light colored or white horizontal spaces are printed on a plurality of sheets, the striped bands being of graduated height and spacing, and of gradated color intensity and contrast from vivid to fade-out for successive selective use as handwriting skills improve during the instructional progress.

4 Claims, 5 Drawing Figures

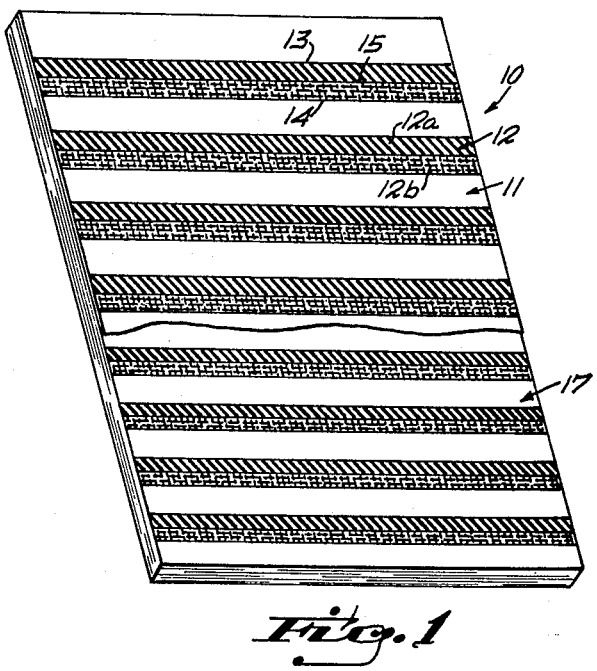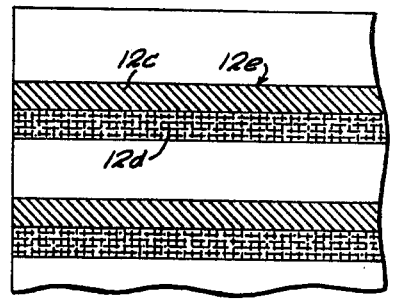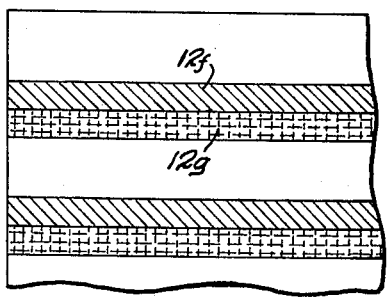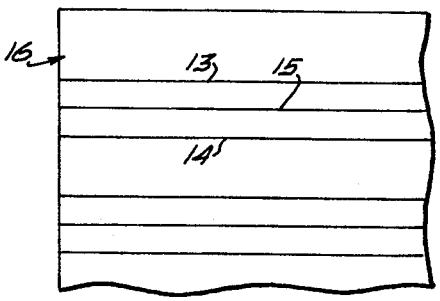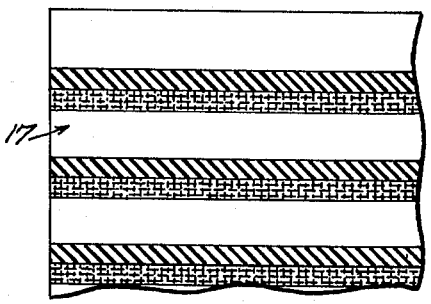

INSTRUCTIONAL WRITING PAPER FOR PERCEPTUALLY IMPAIRED CHILDREN

BACKGROUND OF THE INVENTION

This invention relates to instructional writing paper for dysgraphic children, i.e., those having unusual difficulty in producing legible handwriting because of perceptual impairment.

The use of lined paper as an aid in teaching young children to write legibly is common practice in kindergarten and in the lower grades. Various kinds of such lined paper have heretofore been devised, including triple-lines and bands defining spacial and height guidance for the various elements of upper and lower case letters, whether manuscript or cursive. These bands and guidelines, some of which have been variously colored to more obviously define the spaces in which the instructional writing is to be performed, have proved to be of great value in the instruction and learning of normal children. Typical among such instructional writing papers heretofore devised is the writing readiness paper described in U.S. Pat. No. 3,638,332 to Jones. Such known instructional writing papers, however, have all been directed to young children of normal intelligence and perceptual abilities, and have been found to be only of limited benefit as an instructional aid in the teaching of manuscript and cursive writing to perceptually impaired children. Thus, I have found that the principal difficulty in teaching writing skills to dysgraphic children is their comparative inability to bridge the gap between writing within the color bands and writing between the guidelines defining the color bands without color or without contrasting colors. In other words, although vivid color contrast lines and bands are of some aid in developing writing skills in the perceptually impaired, dysgraphic or minimally motivated children, the improvement in beginning skills thereby learned do not carry over well to writing between guidelines and bands without the contrasting color bands. The bands are also limited in the number of colors and repetition of sequence, therefore, eliminating the confusion encountered on regular paper with its varying instructional lines and colors.

It is, accordingly, the principal object of my invention to provide a novel and improved system of instructional writing paper that obviates the above-described deficiencies in instructional writing papers heretofore devised, and which is particularly well suited to the teaching of writing skills to children who have problems with sequential memory, visual motor integration, visual discrimination, spacial recognition and placement, foreground-background confusion, and the like perceptual impairment.

A more particular object of the invention is to provide a system of instructional writing paper for perceptually impaired children wherein the stripes of contrasting colors in a plurality of sets of two-striped bands are of gradated intensity from strong contrasting colors through weak color contrast or intensity and finally to complete fade-out of color, whereby the disruptive gap in instructional guidance is obviated while advancing from writing with the aid of the color stripes to writing between the guidelines without distinguishing color stripes. Combined with the concept of gradated color intensity from vivid to complete fade-out of the color band stripes, is graduation of the width of the striped bands or the lines defining these striped bands from large to small, and graduation of the spacing between the bands from large to small, these various graduations being directed, generally, towards greater difficulty in use. Various combinations of color intensity, band and stripe width, and band spacing are thus available for successive use as the child progresses in writing skills. The combinative use of these graduated features can be varied from child to child to best accommodate his or her particular perceptual difficulties during the learning process.

Other objects, features and advantages of the invention will be apparent from the following description when read with reference to the accompanying drawings.

BRIEF DESCRIPTION OF THE DRAWINGS

In the drawings, wherein like reference numerals denote corresponding parts throughout the several views:

FIG. 1 is an oblique view, as seen from the front, of a pad of instructional writing paper embodying the invention;

FIGS. 2, 3 and 4 are fragmentary plan views of various sheets of the paper pad illustrated in FIG. 1, on an enlarged scale and illustrating gradated variations of the striped band color intensity to complete fade-out in FIG. 4; and FIG. 5 is a fragmentary plan view of a sheet of instructional writing paper showing the smaller size of band width and band spacing for advanced instructional use.

DESCRIPTION OF PREFERRED EMBODIMENT

Referring now in detail to the drawings, reference numeral 10 in FIG. 1 designates, generally, a pad of instructional writing paper embodying my invention, the front sheet 11 of which, as illustrated, comprises a plurality of spaced parallel printed bands 12, each of which is comprised of contiguous upper and lower colored stripes 12a, 12b. The stripes 12a, 12b are printed in vividly contrasting colors, green and yellow, respectively, for example, the paper otherwise preferably being white. As further illustrated in FIG. 1, the stripes of each color band of the front sheet are well defined by contrastingly dark upper and lower edge lines 13, 14, respectively, and line 15 defining the contiguous edge between the two color stripes. Preferably, the color stripes 12a, 12b will be of equal width, whereby line 15 will be centrally located between upper and lower lines 13, 14. Spacing between printed bands 12 will preferably be substantially the same as band height.

FIGS. 2 and 3 show instructional paper sheets which will preferably be part of the pad 10 similar to the sheet illustrated in FIG. 1 at the front of the pad, but differing only in that the stripes 12d, 12e of the band 12c in FIG. 2 are somewhat lesser color intensity. The color intensity of the stripes 12f, 12g of FIG. 3 are even lesser then that of FIG. 2. FIGS. 1, 2 and 3 therefore illustrate gradations in color intensity of band stripes from vivid to near fade-out, as exemplified in FIG. 3, whereafter, as illustrated in FIG. 4, instructional paper of complete color fade-out, that is, paper with writing bands defined by only the three lines 13, 14 and 15, is provided for writing guidance.

Reference numeral 16 in FIGS. 1 and 5 illustrates instructional paper for advanced students, for example those who have progressed through instruction beginning with use of the high color intensity bands of sheet 12 to the complete color fade-out instructional sheets 15 of FIG. 4, the instructional sheets 16 differing from those in FIG. 4 only in that the spacing between the guidelines is proportionately smaller, thereby presenting a greater challenge to the student who has improved progressively with his fine motor skills.

It will be apparent from the foregoing description that there is provided in the instuctional writing paper comprising the invention a graduated system of instructional sheets which can be varied in their progressive sequence of usage to accommodate to differences in the various writing skills and abilities of the individual perceptually impaired children. Thus, it is to be understood that for this purpose, pluralities of each of the various different above-described instructional sheets may be bound at the top of the pad in ordinary fashion so that any particular sheet needed can be taken from the pad as required.

My invention provides several advantages to slow learning children or children with perceptual difficulties. The colored patterns are beneficial in assisting the children to differentiate and place upper and lower case letters appropriately. The colored patterns of the writing paper promote the coordination of vision wiht the movements of the body. The visual cues assist the students to channel their energy and skills into purposeful directed physical movements which are needed for succesful writing.

The high-lighted writing boundaries supply additional information with regard to visual cues. With this extra information, dysgraphic students can successfully number their paper in an orderly fashion and place their answers of an assignment with its corresponding number.

The highly structured and simplified nature of the writing paper provides the means by which a dysgraphic student can independently review and correct the placement of his graphic symbols.

With proper instruction, the specially designed writing paper serves to curtail the waste of time and energy experienced by dysgraphic, slow and perceptually impaired children. As a result of increasingly appropriate written responses, the students gain confidence in their ability to write. The childrens' success is frequently accompanied by growing feelings of self-worth, which may be carried over into all aspects of academic and social life. The instructional writing paper for perceptually impaired children herein described has been tested with young children in the primary grades as well as with those having varying exceptionalities; such as the retarded, autistic, minimally visually handicapped, emotionally disturbed and children that are afflicted with cerebral palsy. The improved instructional paper herein claimed has proven to be beneficial as a remedial tool for these varying exceptionalities.

While I have illustrated and described herein only one form in which my invention can conveniently be embodied in practice, it is to be understood that this embodiment is presented by way of example only and not in a limiting sense.

My invention, in brief, comprises all of the embodiments and modifications coming within the scope and spirit of the following claims.

I claim:

1. An instructional writing paper system for perceptually impaired children comprising, in combination:
   a. a plurality of sheets of paper,
   b. a plurality of spaced parallel bands on each of said sheets of paper,
   c. each band comprising a pair of co-extensive contiguous stripes,
   d. a first sub-plurality of said bands being of mutually different colors differing from the color of said sheets of paper,
   e. said first sub-plurality of bands being sub-divided into a plurality of second sub-pluralities of bands, the stripes of which are of mutually graduated color intensities from vivid to complete fade-out, and
   f. the outer edges of said stripes and contiguous edges of the stripes of each of said bands being defined by contrastingly dark lines.

2. An instructional writing paper system as defined in claim 1 wherein said plurality of sheets of paper are bound in a pad.

3. An instructional writing paper system for perceptually impaired children as defined in claim 1 and further comprising a third sub-plurality of said bands, including bands of said first sub-plurality and being divided into pluralities of third sub-pluralities of bands, the stripes of which are of mutually graduated width.

4. An instructional writing paper system as defined in claim 3 wherein said plurality of sheets of paper are bound in a pad.

* * * * *